UNITED STATES PATENT OFFICE.

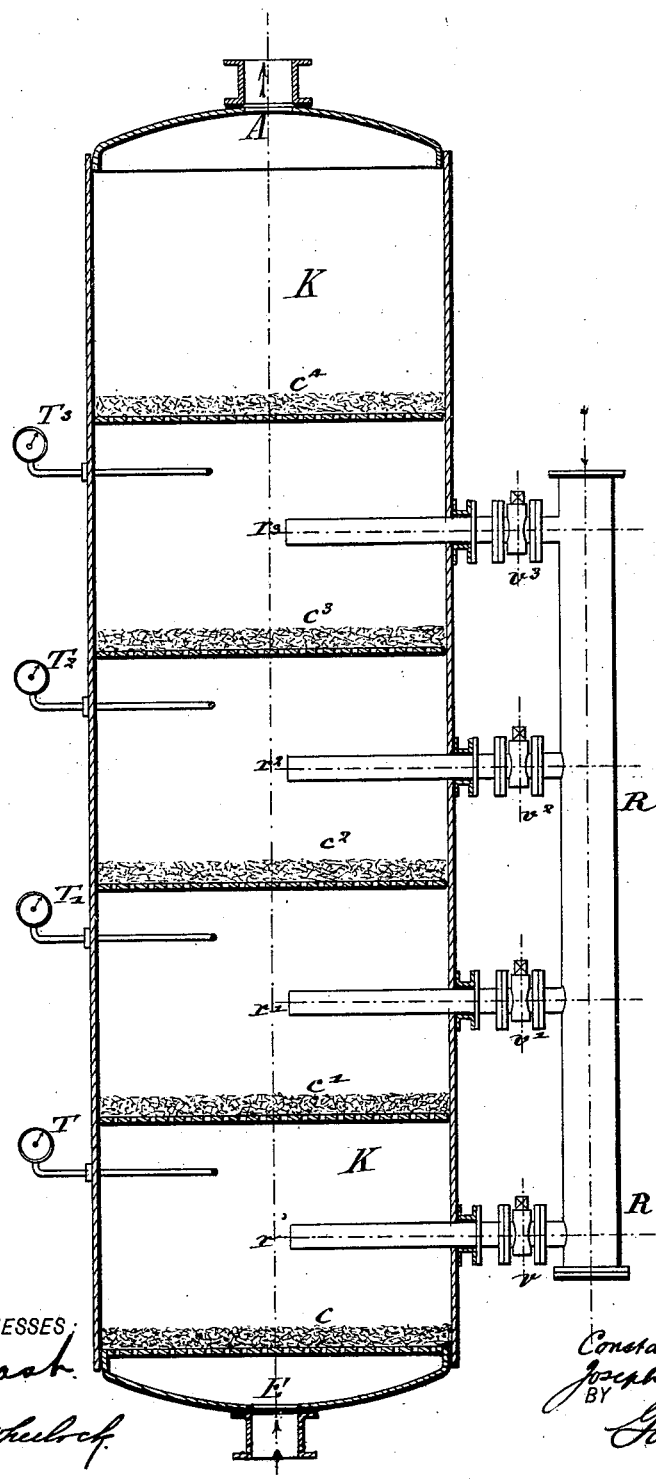

CONSTANTIN KRAUSS AND JOSEPH WACH, OF HÖCHST-ON-THE-MAIN, GERMANY, ASSIGNORS TO THE FARBWERKE, VORM. MEISTER, LUCIUS & BRÜNING, OF SAME PLACE.

METHOD OF MAKING SULFUR TRIOXID.

SPECIFICATION forming part of Letters Patent No. 677,670, dated July 2, 1901.

Application filed February 18, 1899. Serial No. 705,965. (No specimens.)

*To all whom it may concern:*

Be it known that we, CONSTANTIN KRAUSS, Ph. D., and JOSEPH WACH, chief engineer, citizens of the Empire of Germany, residing in Höchst-on-the-Main, Germany, have invented certain new and useful Improvements in the Manufacture of Sulfur Trioxid, (Sulfuric Anhydrid,) of which the following is a specification.

It is known that in the manufacture of sulfur trioxid (sulfuric anhydrid) by the contact process, especially if the $SO_2$ gases to be treated are of great concentration, so high a temperature of the reaction gases is produced that on the one hand the apparatus and the contact become damaged, and in the course of time are thus rendered useless, while on the other hand a reproduction of $SO_2$ is liable to take place by the dissociation of $SO_3$. We have found a method which permits within certain limits exact regulation of the temperature of the gases in the contact-chamber, thus avoiding the above-mentioned objections and permitting the employment simultaneously of the heat of reaction evolved in the manufacture of sulfur anhydrid. For this purpose cold currents of gases containing $SO_2$ capable of being regulated are directed at different places into the contact-chamber and are mixed with the hot reaction gases, the temperature of which can thus be lowered to any extent desired and a uniform heat advantageous for the process can be obtained.

The process is illustrated by the following example and accompanying drawing.

In the contact-chamber K the contacts $c$ $c'$ $c^2$ $c^3$ are arranged in successive floors. The gases containing five to twelve per cent. $SO_2$ previously heated to the reaction temperature of about 400° centigrade enter the chamber at E and pass through the contact-body $c$, placed on the first floor. An oxidation of part of the $SO_2$ into $SO_3$ takes place, and the heat of reaction thus evolved raises the temperature of the reaction gases. From pipes R, by means of a regulation-valve $v$, cold gas containing $SO_2$ is allowed to enter the contact-chamber at $r$ and to mix with the hot gases by means of an appropriate distributer in such quantities that the gas mixture thus obtained has a temperature approaching that originally existing at E. For instance, on the rising of the gases in the contact-chamber from about 400° to 450° centigrade cold gases of about 20° centigrade are introduced till the temperature has fallen to about 400° centigrade. In order to measure the temperature in the contact-chamber, measuring instruments are put up.

On each successive contact-floor $c'$, $c^2$, $c^3$, &c., the above-described process is repeated, and the action can be closely watched by the heat-indicators T T' $T^2$, &c., and exactly regulated by the valves $v'$ $v^2$, &c. The process in the upper compartments is to be conducted in such a manner that the gases leaving the contact-chamber at A are of a sufficiently high temperature to be utilized for heating the $SO_2$ gases entering at E.

It is easily possible by this method to maintain throughout the contact-chamber and during the whole of the process a temperature favorable to the reaction, which, however, is not confined within very close limits, and thus on the one hand a thorough conversion of $SO_2$ into $SO_3$ is obtained, avoiding injurious overheating of the contact and apparatus; while on the other hand not only is injurious excess of heat in the contact-chamber prevented, but the heat evolved can be utilized in the conversion of further $SO_2$ gases into $SO_3$.

Having now described our invention, what we claim is—

1. The improvement in the art of manufacturing sulfuric anhydrid by the contact method which consists in introducing into the contact-chamber a current of gas containing sulfur dioxid and oxygen heated to the temperature of conversion and introducing at another point of said contact-chamber a comparatively cool current of gas containing sulfur dioxid and oxygen, substantially as described.

2. The improvement in the art of manufacturing sulfuric anhydrid by the contact method which consists in passing a portion of the gas containing sulfur dioxid and oxygen heated to the temperature of conversion through a portion of the contact material, then mixing with the reaction gases therefrom a further quantity of comparatively cool gas containing sulfur dioxid and oxygen and then
5 passing said mixed gases through a further portion of contact material, substantially as described.

In testimony that we claim the foregoing as our invention we have signed our names in presence of two subscribing witnesses.

CONSTANTIN KRAUSS.
JOSEPH WACH.

Witnesses:
HEINRICH HAHN,
ALFRED BRISBOIS.